United States Patent
Stadmark

(10) Patent No.: US 6,434,368 B1
(45) Date of Patent: Aug. 13, 2002

(54) DIODE-BASED SWITCH FOR A RADIO TRANSCEIVER

(75) Inventor: Sven Stadmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/181,135

(22) Filed: Oct. 27, 1998

(51) Int. Cl.$^7$ .................................................. H04B 1/44
(52) U.S. Cl. ............................ 455/83; 455/78; 455/82; 455/127
(58) Field of Search .............................. 455/73, 78, 79, 455/80, 81, 82, 83, 127, 129, 126, 69, 522; 333/101, 103, 105, 262; 335/4

(56) References Cited

U.S. PATENT DOCUMENTS

| | | | |
|---|---|---|---|
| 4,703,250 A | | 10/1987 | Frappe et al. ................ 323/317 |
| 5,060,293 A | | 10/1991 | Kok et al. ..................... 455/78 |
| 5,109,538 A | * | 4/1992 | Ikonen et al. ................ 455/127 |
| 5,230,090 A | | 7/1993 | Zametzer et al. ............. 455/80 |
| 5,276,912 A | * | 1/1994 | Siwiak et al. ................. 455/73 |
| 5,584,053 A | * | 12/1996 | Kommrusch et al. ......... 455/82 |
| 5,896,563 A | * | 4/1999 | Kawanami et al. ........... 455/82 |

FOREIGN PATENT DOCUMENTS

| | | |
|---|---|---|
| DE | 40 29 788 A1 | 3/1992 |
| EP | 0 746 118 A1 | 12/1996 |
| EP | 101984 | 4/1999 |
| JP | 58-85644 | 5/1983 |
| JP | 2-162919 | 6/1990 |

OTHER PUBLICATIONS

Hewlett Packard, Application Note 1067, "An SPDT PIN Diode T/R Switch for PCN Applications", 1994, pp. 1–9.
Knut Brenndörfer, Jörg, Lützner, "Antenna Switches with PIN Diodes for Digital Mobile Communications", Siemens Semiconductor Group, Components XXIX (1994) No. 2, pp. 26–29.

* cited by examiner

Primary Examiner—Lester G. Kincaid
(74) Attorney, Agent, or Firm—Jenkens & Gilchrist, P.C.

(57) ABSTRACT

A method and apparatus are disclosed for efficient transmission over a range of power levels with a diode-based T/R switched transceiver (e.g., PIN-diode switch), whereby a small amount of current flows through the switch at the lower power levels, and a large amount of current flows through the switch at the higher power levels. In a transceiver that can transmit at different power levels, a control unit sets the power amplifier to a specific gain for a specific power level. The control unit knows what power level the transceiver's power amplifier is set to. Consequently, using a controllable current source, the control unit can set the current through the switch to a suitable value that minimizes the total current consumption, including the current consumption in both the power amplifier and the switch.

21 Claims, 2 Drawing Sheets

DIODE-BASED SWITCH FOR A RADIO TRANSCEIVER

BACKGROUND OF THE INVENTION

1. Technical Field of the Invention

The present invention relates in general to the telecommunications field and, in particular, to a current-controlled diode-based transmit/receive (T/R) switch for a radio transceiver, such as, for example, a PIN-diode T/R switch.

2. Description of Related Art

In radio transceivers that do not transmit and receive simultaneously, a T/R switch is commonly used at the transceiver's antenna port. The T/R switch has three ports: a common port (ANT) connected to the transceiver's antenna; a transmit (TX) port connected to a power amplifier (PA); and a receive (RX) port connected to the front end of the transceiver's receiver. The purpose of the T/R switch is to provide a low loss connection between the PA and the antenna while in the transmission mode, isolate the receiver from the TX power when the PA is operating (in the transmission mode), and provide a low loss connection between the antenna and the receiver while in the receive mode.

If a T/R switch is implemented similar to the PIN diode T/R switch arrangement shown in FIG. 1, it is necessary for current to flow through the PIN diodes (1, 2) while in the TX mode. Basically, this type of switch has two modes of operation: the TX mode and a RX mode. While the switch is operating in the RX mode (depending on the bias level 6 applied via the inductor 7), no current flows through the PIN diodes (1, 2), and both diodes present a high impedance (and a low insertion loss) in the RX path. While operating in the TX mode, current flows through both diodes (1, 2), and they present a very low impedance. The quarter-wavelength transmission line (3) causes diode 2 to act as an open circuit (as seen from Node 9), and the path between the TX port and the antenna (8) has a relatively low loss because the diode 1 in that path acts as a virtual short circuit.

Referring to the diagram of a prior art transceiver unit with PIN diode-based T/R switch technology as shown in FIG. 2, in the TX mode, if the current flow through the diodes ($I_{SW}$) is decreased, the insertion loss (for a radio frequency or RF signal) in the switch will be increased. Consequently, in order to compensate for that loss, the output power of the transmitter section's PA ($P_{PA}$) has to be increased so that the power delivered to the antenna ($P_{ANT}$) will be maintained. Additionally, if the output power of the PA is increased, the current consumption in the PA will also be increased.

The use of PIN diode T/R switch technology in the prior art is exemplified in the Hewlett Packard Application Note 1067, entitled "An SPDT PIN Diode T/R Switch for PCN Applications," and the Siemens Application Note by Knut Brenndörfer and Jörg Lützner, entitled "Antenna switches with PIN diodes for digital mobile communications". Also, German Patent No. DE-4029788 discloses a method for reducing current in a PIN diode T/R switch which is operating in the RX mode. A PIN diode T/R switch of the type disclosed in the German Patent is shown in FIG. 3.

Returning to FIG. 2, the prior art methods that use a PIN diode-based T/R switch can be illustrated by the diagram shown in this FIGURE. Essentially, the value of the resistor, R, sets a fixed amount of current that biases the T/R switch's PIN diodes (not explicitly shown) in the TX mode. The resistive value is typically chosen to provide a fairly low insertion loss at the highest $P_{ANT}$ level. If the transceiver is required to transmit at only one specific output power level, then the switch current, $I_{SW}$, can be chosen so that the sum of the switch current, $I_{SW}$, and the power amplifier current, $I_{PA}$, is minimized. As such, the use of too low a value of $I_{SW}$ will result in a higher insertion loss in the T/R switch, which would require more output power from the PA ($P_{PA}$) and, consequently, an increase in the total current consumed. On the other hand, the use of too high a value of $I_{SW}$, will not significantly decrease the insertion loss in the T/R switch, and the additional PIN diode current that results will increase only the total current.

In this regard, a significant problem occurs if a transceiver is required to be able to transmit over a range of different output power levels. The value of the switch current, $I_{SW}$, will be optimized for only one output power level. For other output power levels, the value of $I_{SW}$ will be sub-optimal (i.e., too high or too low). In other words, the prior art solution to the problem of transmitting at different power levels results in a compromise. As such, the loss between the PA and the antenna has a major effect on a transceiver's overall efficiency, but at the lower power levels, that loss is relatively unimportant. However, at the low power levels, it is disadvantageous to allow an unnecessarily large amount of current flow through the PIN switch, because that current forms a large part of the total current being consumed. At the low power levels, the PA itself does not consume much power. In that regard, if the transceiver is part of a battery-powered device (e.g., mobile cellular phone), it is important to minimize the transceiver's overall current consumption.

The technology disclosed in the above-described German Patent does not deal specifically with this particular power consumption problem. Instead, the German Patent discloses a method for reducing current in a PIN diode T/R switch operating in the RX mode. As such, this method is not useful for the type of T/R switch disclosed in FIG. 1, because this switch does not consume any current in the RX mode. However, as described in detail below, the present invention successfully resolves the above-described problems.

SUMMARY OF THE INVENTION

In accordance with the present invention, a method and apparatus are provided for efficient transmission over a range of power levels with a diode-based T/R switched transceiver (e.g., PIN-diode switch), whereby a small amount of current flows through the switch at the lower power levels, and a large amount of current flows through the switch at the higher power levels. In a transceiver that can transmit at different power levels, a control unit sets the power amplifier to a specific gain for a specific power level. The control unit knows what power level the transceiver's power amplifier is set to. Consequently, using a controllable current source, the control unit can set the current through the switch to a suitable value that minimizes the total current consumption, including the current consumption in both the power amplifier and the switch.

An important technical advantage of the present invention is that the current consumption of the transceiver will be decreased over the complete range of transmitted power levels.

Another important technical advantage of the present invention is that if the transceiver is part of a battery-powered unit, the life of the battery will be increased.

Yet another important technical advantage of the present invention is that the switch current is optimal for all transmitted power levels.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with the present invention, a method and apparatus are provided for efficient transmission over a range of power levels with a diode-based T/R switched transceiver (e.g., PIN-diode switch), whereby a small amount of current flows through the switch at the lower power levels, and a large amount of current flows through the switch at the higher power levels. In a transceiver that can transmit at different power levels, a control unit sets the power amplifier to a specific gain for a specific power level. The control unit knows what power level the transceiver's power amplifier is set to. Consequently, using a controllable current source, the control unit can set the current through the switch to a suitable value that minimizes the total current consumption, including the current consumption in both the power amplifier and the switch.

Figure 1:
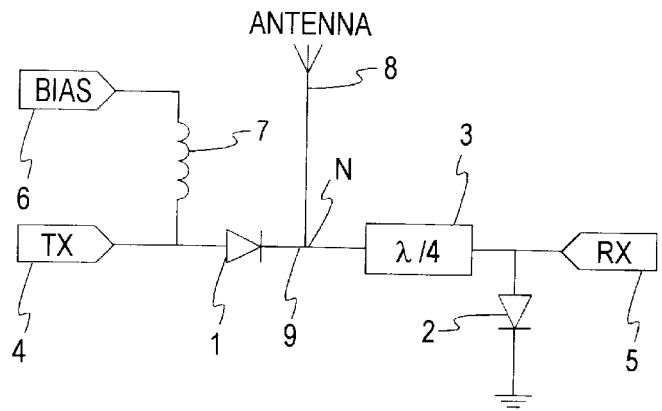
FIG. 1 is diagram of a prior art PIN diode T/R switch arrangement.
Figure 2:
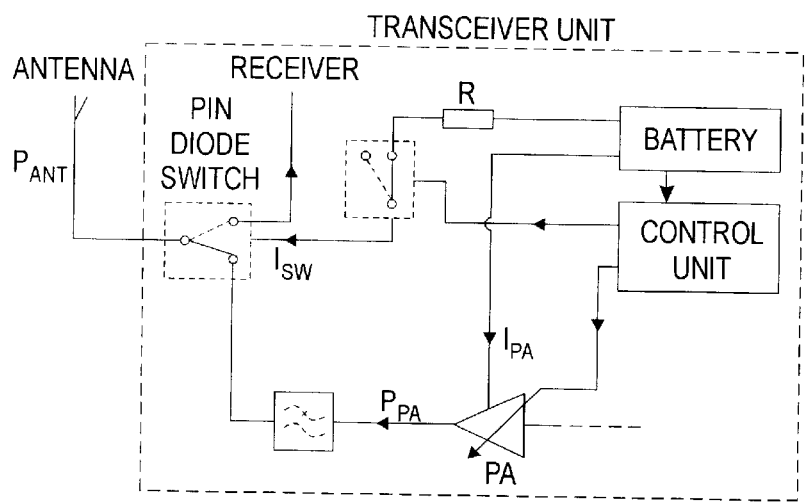
FIG. 2 is a block diagram of a prior art transceiver unit with PIN diode-based T/R switch technology.
Figure 3:
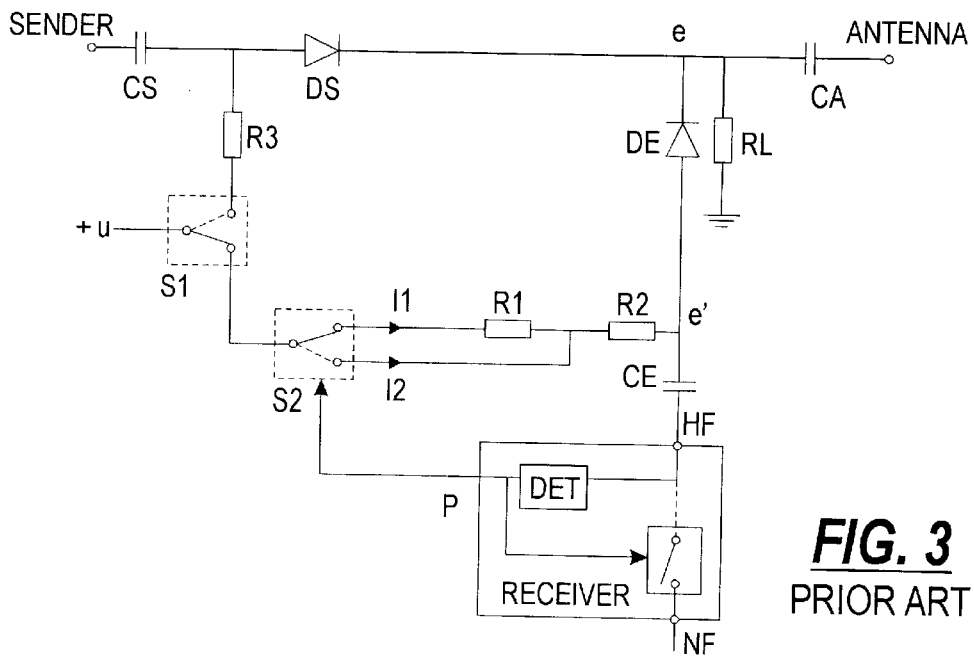
FIG. 3 is a diagram of a PIN diode T/R switch of the type disclosed in German Patent No. DE-4029788.
Figure 4:
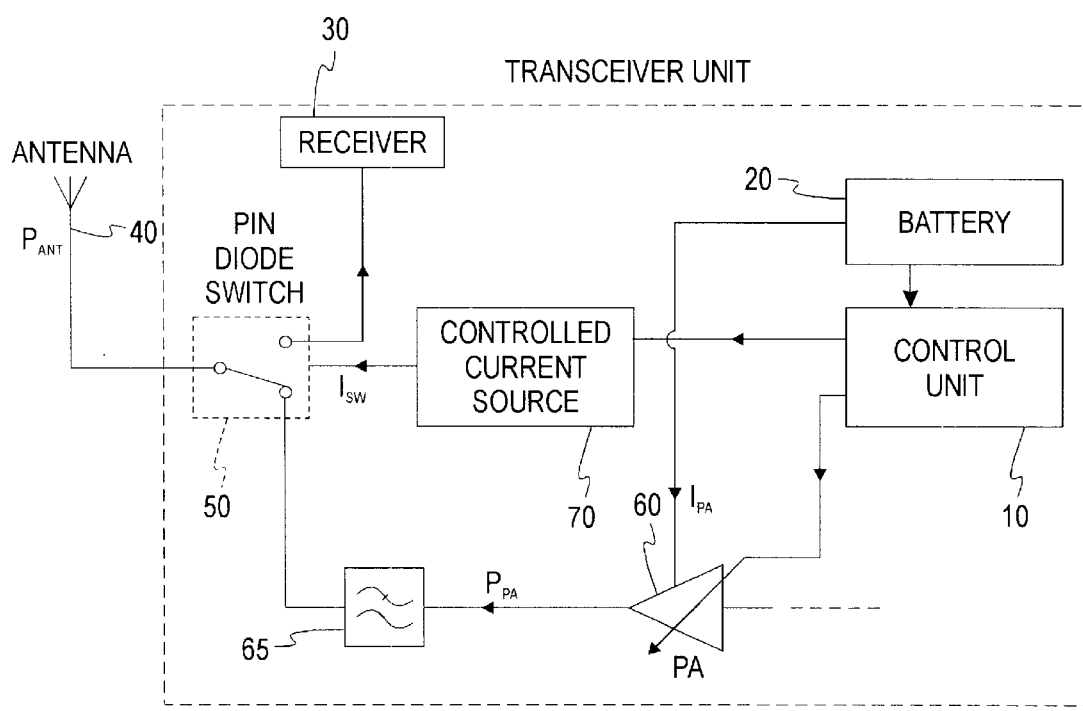
FIG. 4 is a block diagram of an exemplary transceiver unit, which can be used to implement a preferred embodiment of the present invention.

Specifically, FIG. 4 is a block diagram of an exemplary transceiver unit, which can be used to implement a preferred embodiment of the present invention. For this embodiment, the transceiver unit shown in FIG. 4 can be implemented in a time division multiple access (TDMA) system. However, the invention is not intended to be so limited and can include any transceiver that uses a diode-based T/R switch, such as, for example, a PIN-diode T/R switch. Referring to FIG. 4, the transceiver shown includes a T/R switch 50, which operates in two major modes: a RX mode and a TX mode. In the RX mode, the antenna 40 is coupled via the T/R switch 50 to an input of the receiver 30. In the RX mode, the PA 60 is not operating.

In the TX mode, the PA 60 generates an output signal, which is coupled to the antenna 40 via a lowpass filter 65 and the T/R switch 50. The PA 60 is capable of delivering output power levels over a wide range, and any specific output power level used is selected by the control unit 10. For this embodiment, a DC power supply (e.g., a battery) 20 is used to supply operating current for the PA 60.

The control unit 10 sets the antenna output power, $P_{ANT}$ by a control signal coupled directly to the PA 60, and by setting an appropriate current, $I_{SW}$, with a controlled current source 70 to supply the PIN diode T/R switch 50. For example, when the transmit output power ($P_{ANT}$) is set to a relatively high value (e.g., 2W), then the control unit 10 sends a signal to the controlled current source 70 to set the $I_{SW}$ to a proportionately high value (e.g., 20 mA), in order to reduce the insertion loss in the T/R switch 50. On the other hand, at the other end of the range of possible transmit output power levels, when the $P_{ANT}$ is set to a relatively low value (e.g., 1 mW), then the control unit 10 sends a signal to the controlled current source 70 to set the $I_{SW}$ to a proportionately low value (e.g., 1 mA). In this case, the insertion loss is not as important at the lower power levels, because an increase (e.g., 0.3 dB) of output power from the PA at the lower levels adds only a relatively small amount to the PA's current consumption (e.g., 0.5 mA for 0.3 dB).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving the transmit performance of a radio transceiver using a diode-based transmit/receive switch, comprising the steps of:
   setting a gain level for a power amplifier of said radio transceiver, said gain level selected from within a range of a plurality of gain levels; and
   controlling a current level through said switch to a value selectable for each gain level, said current level selected to substantially minimize current consumption in said transceiver, whereby a small amount of current flows through the switch at lower power levels and a larger amount of current flows through the switch at higher power levels.

2. The method of claim 1, wherein the step of setting a gain level comprises sending a first control signal to said power amplifier of said radio transceiver.

3. The method of claim 1, wherein the step of controlling a current level through said switch comprises sending a control signal to a controllable current source for said switch.

4. The method of claim 1, wherein said current level selected to substantially minimize current consumption in said transceiver comprises substantially a sum of said current level through said switch and a current level through said power amplifier.

5. The method of claim 1, wherein said radio transceiver is battery-powered.

6. The method of claim 1, wherein said radio transceiver comprises a TDMA radio transceiver.

7. The method of claim 1, wherein said diode-based transmit/receive switch comprises a PIN diode switch.

8. A radio transceiver, comprising:
   an antenna,
   a receiver coupled to said antenna by a diode-based transmit/receive switch;
   a power amplifier coupled to said antenna by said diode-based transmit/receive switch, such that said radio transceiver transmits during a first interval and receives during a second interval;
   a control unit coupled to said power amplifier so as to control a gain level of said power amplifier, said gain level selected from within a range of a plurality of gain levels; and
   a controllable current source for said diode-based transmit/receive switch, said controllable current source coupled to said diode-based transmit/receive switch and said control unit, such that said controllable current source controls, to a value selectable for each gain level, a current level through said diode-based transmit/receive switch responsive to said control unit, wherein the current level is selected to substantially minimize current consumption in the transceiver and whereby a small amount of current flows through the switch at lower power levels and a larger amount of current flows through the switch at higher power levels.

9. The radio transceiver of claim 8, wherein said gain level is associated with a first control signal coupled to said power amplifier from said control unit.

10. The radio transceiver of claim 8, wherein said current level through said switch is associated with a control signal coupled from said control unit to a controllable current source for said switch.

11. The radio transceiver of claim 8, wherein said current consumption comprises substantially a sum of said current level through said switch and a current level through said power amplifier.

12. The radio transceiver of claim 8, wherein said radio transceiver is battery-powered.

13. The radio transceiver of claim 8, wherein said radio transceiver comprises a TDMA radio transceiver.

14. The radio transceiver of claim 8, wherein said diode-based transmit/receive switch comprises a PIN diode switch.

15. A PIN-diode switch for a transceiver, comprising:
   a control unit coupled to a power amplifier of said transceiver so as to control a gain level of said power amplifier, said gain level selected from within a range of a plurality of gain levels; and
   a controllable current source for said PIN diode switch, said controllable current source coupled to said PIN diode switch and said control unit, such that said controllable current source controls, to a value selectable for each gain level, a current level through said PIN diode switch responsive to said control unit, wherein the current level is selected to substantially minimize current consumption in the transceiver and whereby a small amount of current flows through the switch at lower power levels and a larger amount of current flows through the switch at higher power levels.

16. The PIN-diode switch of claim 15, wherein said current level is associated with said gain level.

17. The PIN-diode switch of claim 15, wherein said gain level is associated with a first control signal coupled to said power amplifier from said control unit.

18. The PIN-diode switch of claim 15, wherein said current level through said switch is associated with a control signal coupled from said control unit to said controllable current source.

19. The PIN-diode switch of claim 15, wherein said current consumption comprises substantially a sum of said current level through said switch and a current level through said power amplifier.

20. The PIN-diode switch of claim 15, wherein said transceiver is battery-powered.

21. The PIN-diode switch of claim 15, wherein said transceiver comprises a TDMA transceiver.

* * * * *